July 3, 1962 H. J. WIEBE 3,042,130
GROUND MOVER AND RETRIEVER VEHICLE FOR AIRPLANES
Filed Oct. 27, 1959 11 Sheets-Sheet 1
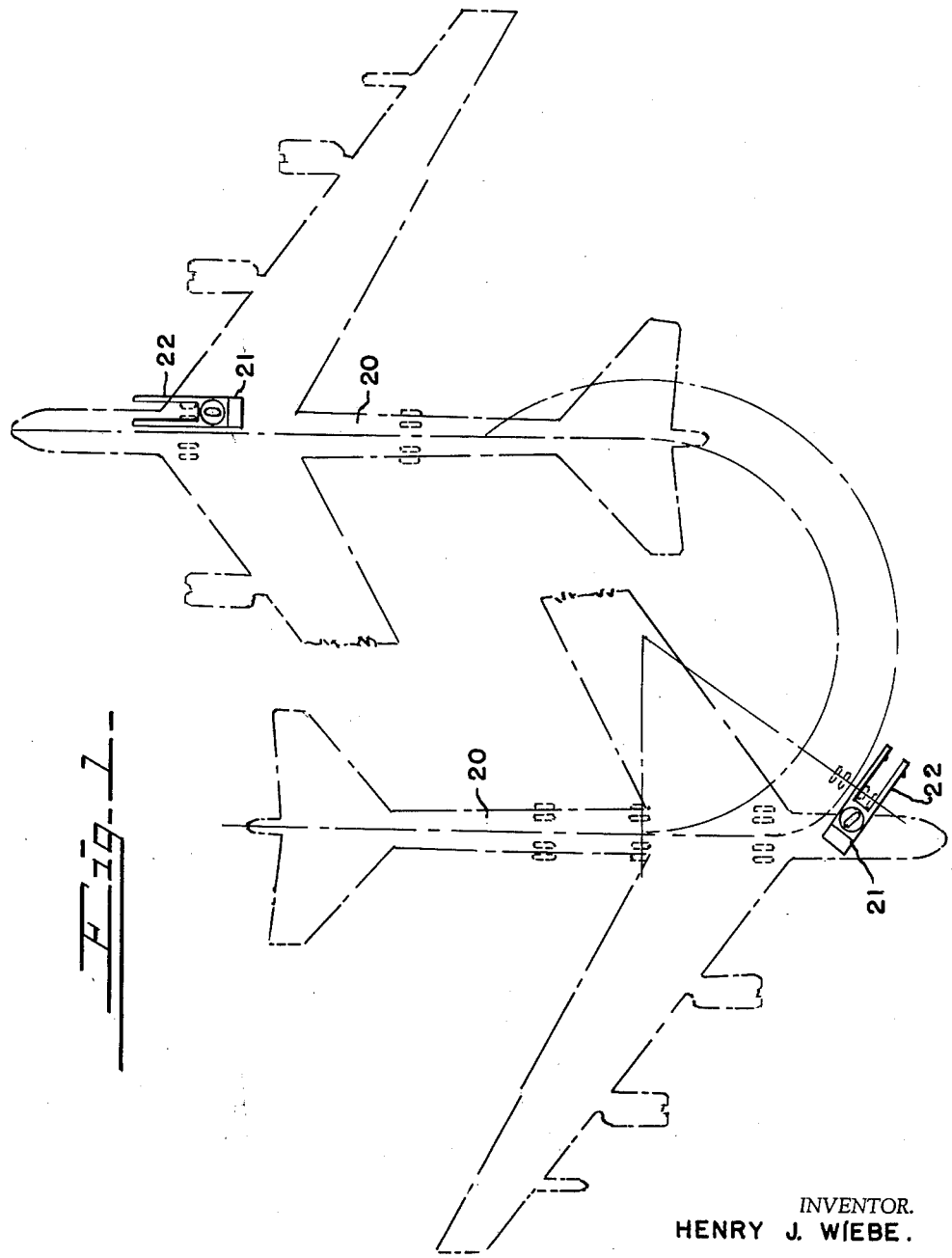
INVENTOR.
HENRY J. WIEBE.
BY
ATTORNEY.

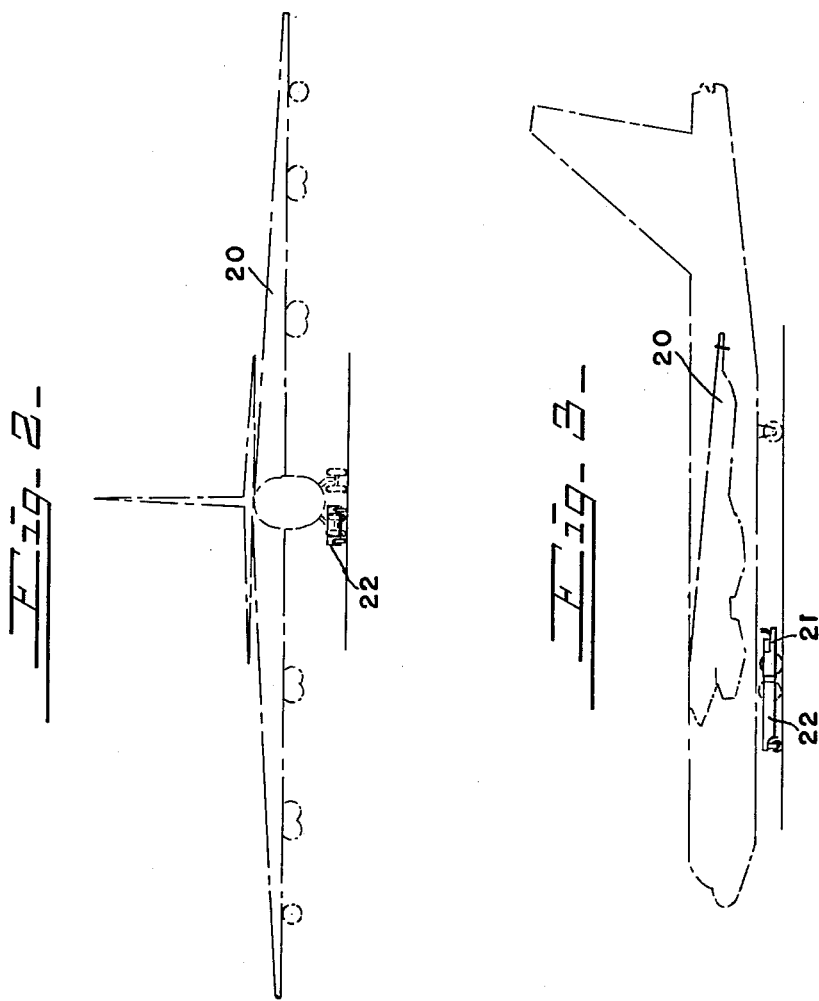

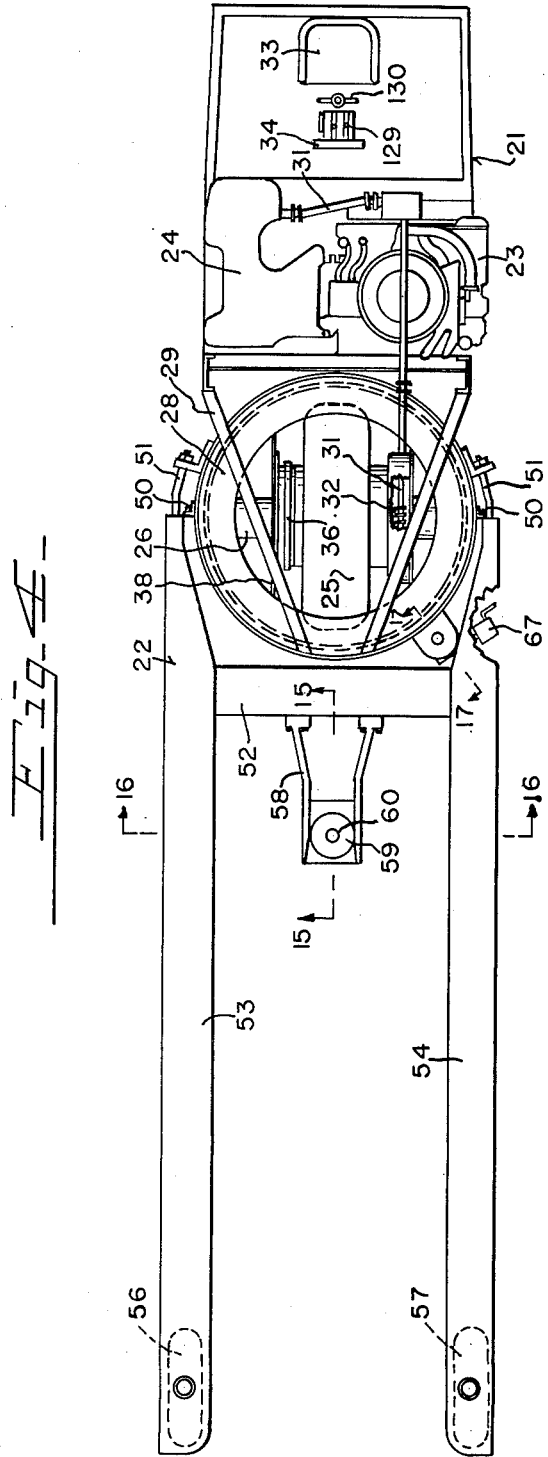

July 3, 1962
H. J. WIEBE
3,042,130
GROUND MOVER AND RETRIEVER VEHICLE FOR AIRPLANES
Filed Oct. 27, 1959
11 Sheets-Sheet 4
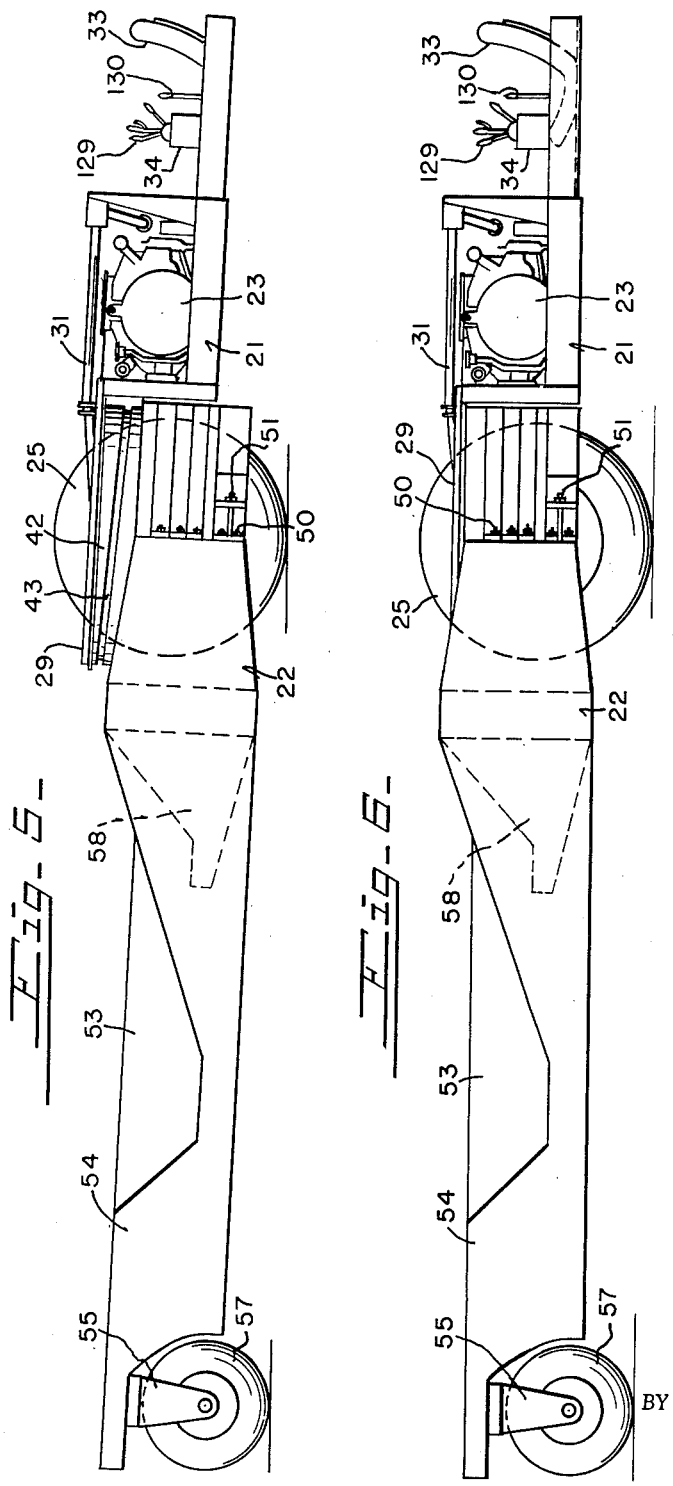
INVENTOR.
HENRY J. WIEBE
BY *H.C. Kavel.*
ATTORNEY.

July 3, 1962 H. J. WIEBE 3,042,130
GROUND MOVER AND RETRIEVER VEHICLE FOR AIRPLANES
Filed Oct. 27, 1959 11 Sheets-Sheet 5

INVENTOR.
HENRY J. WIEBE
BY
*H.C. Kavel,*
ATTORNEY.

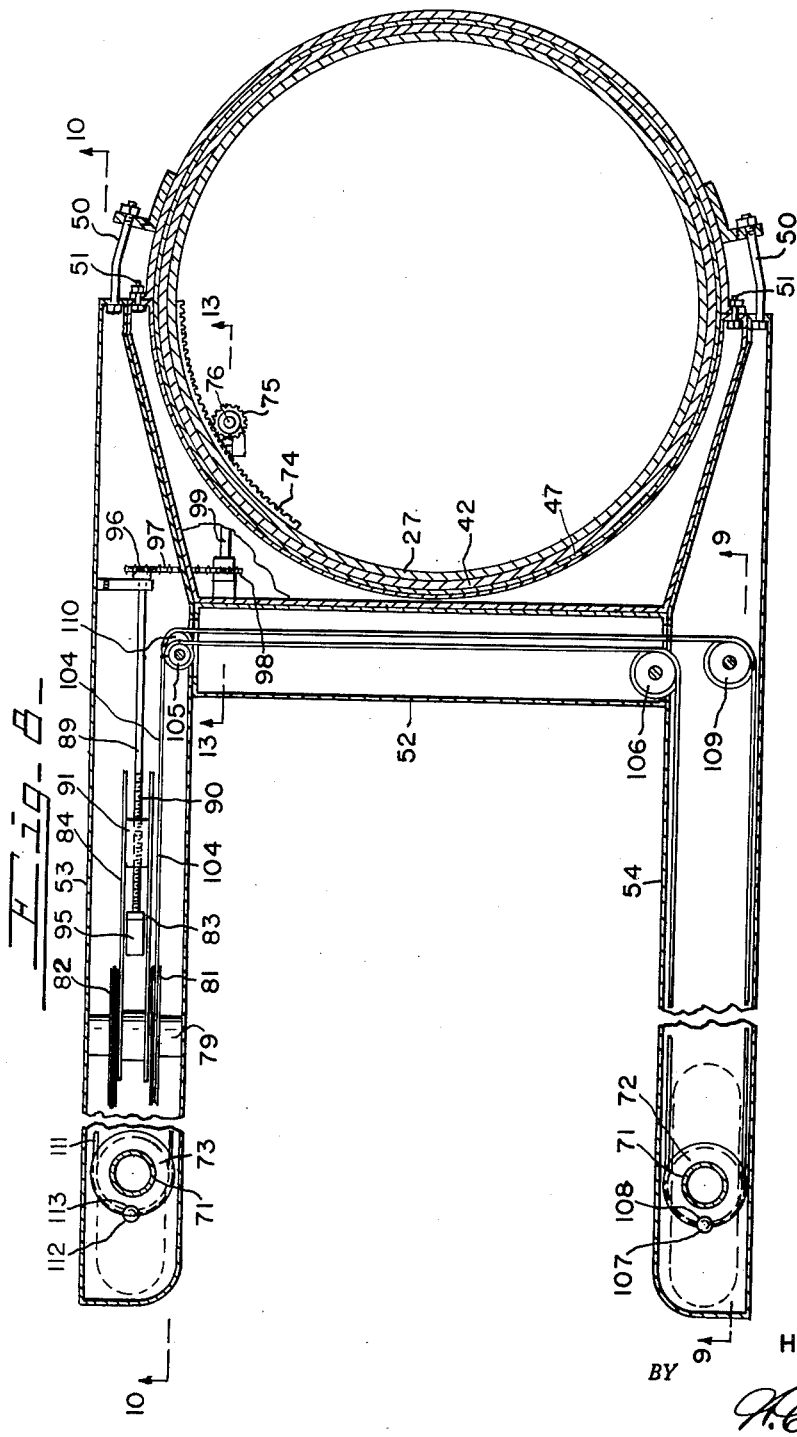

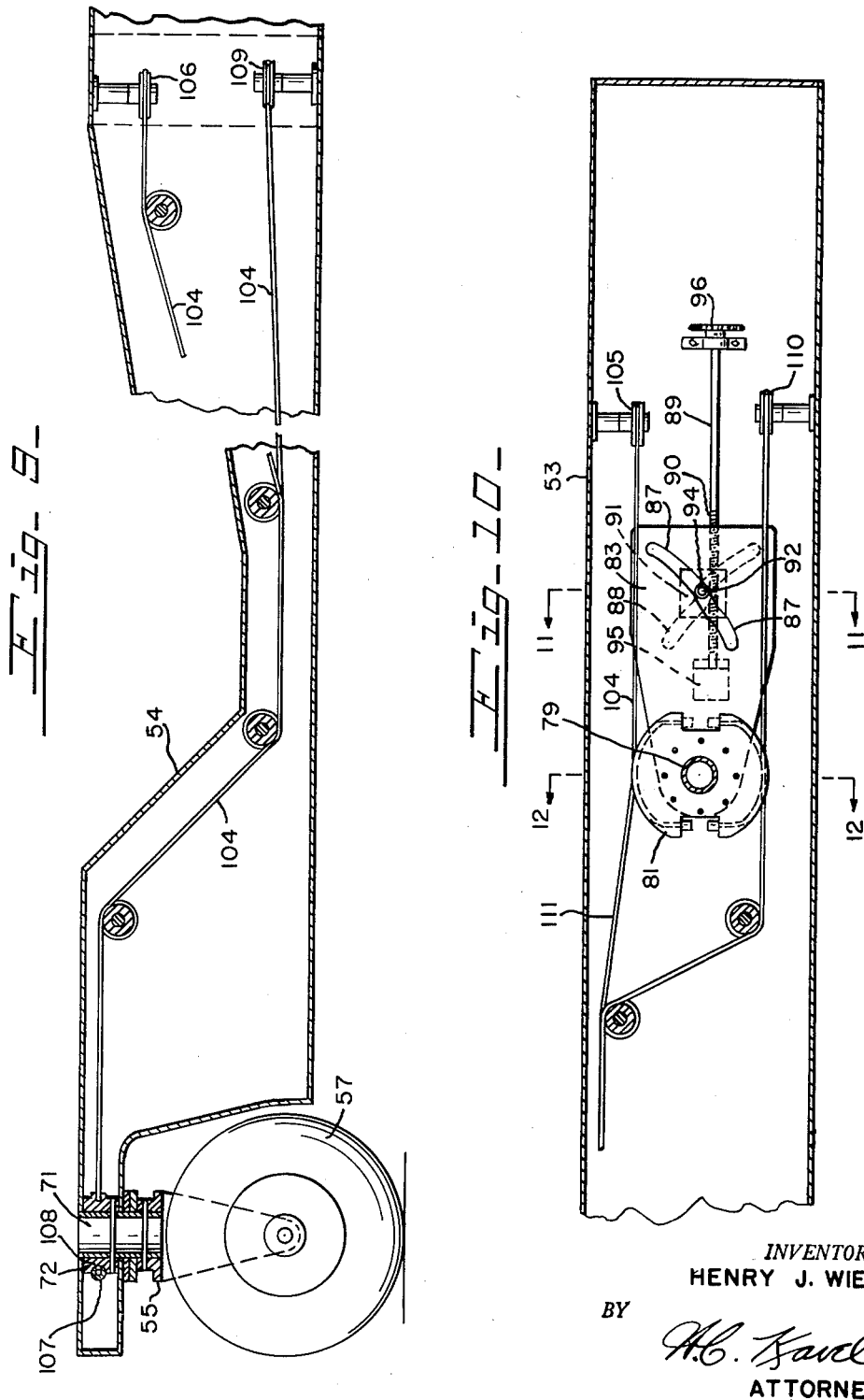

July 3, 1962 H. J. WIEBE 3,042,130
GROUND MOVER AND RETRIEVER VEHICLE FOR AIRPLANES
Filed Oct. 27, 1959 11 Sheets-Sheet 8
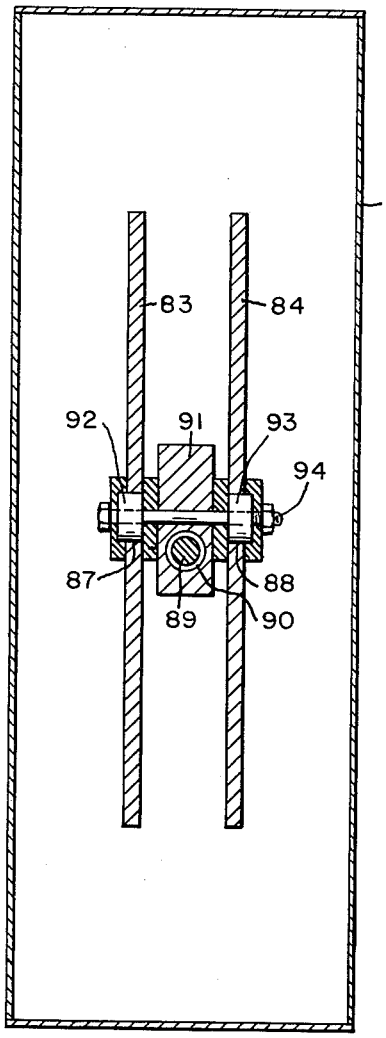
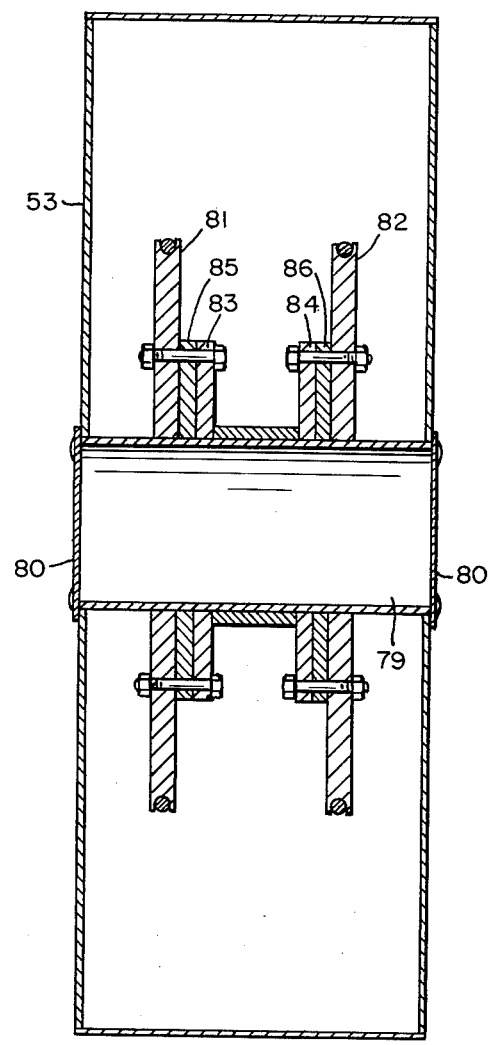
INVENTOR.
HENRY J. WIEBE
BY
ATTORNEY.

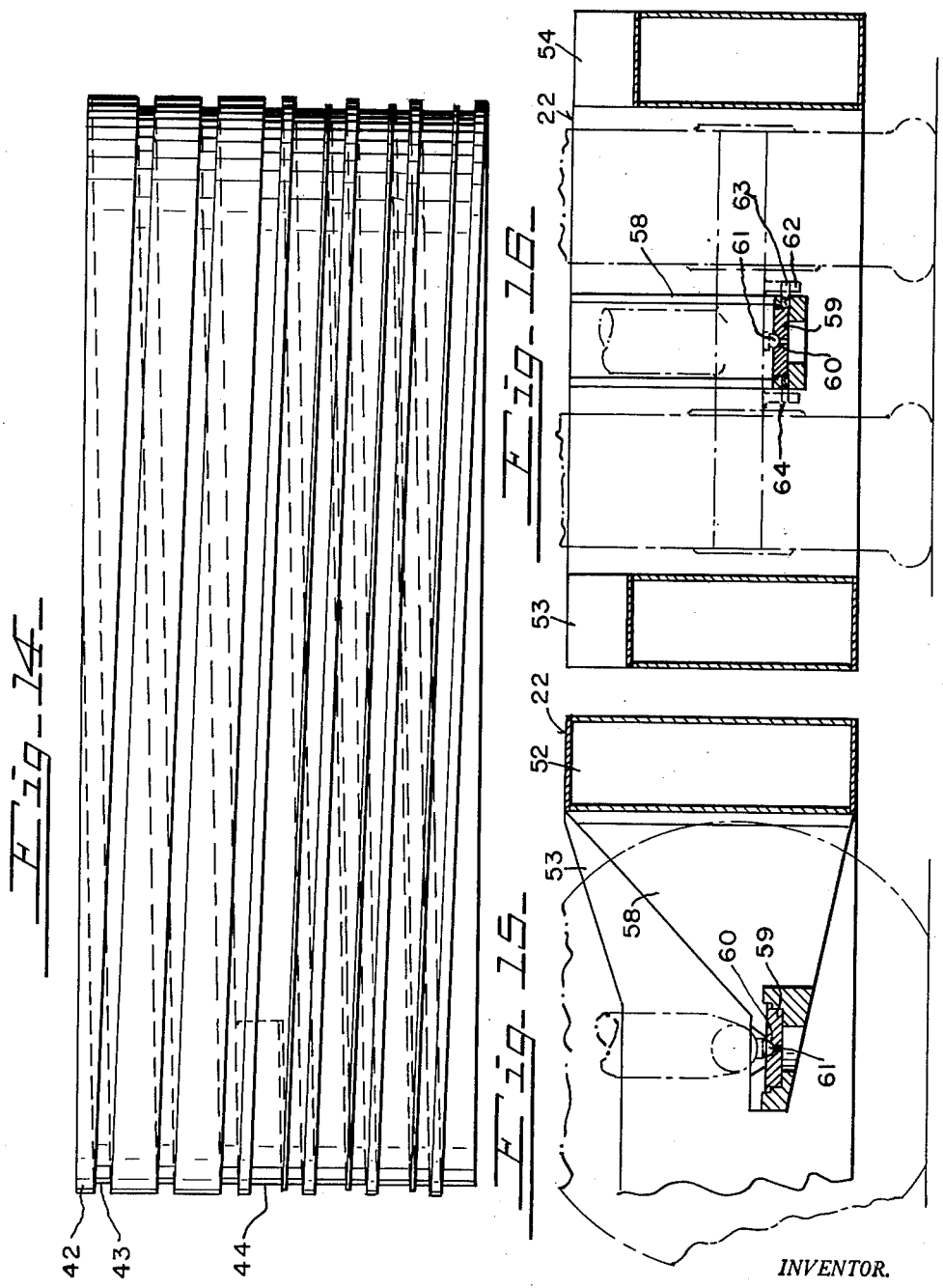

July 3, 1962 H. J. WIEBE 3,042,130
GROUND MOVER AND RETRIEVER VEHICLE FOR AIRPLANES
Filed Oct. 27, 1959 11 Sheets-Sheet 11
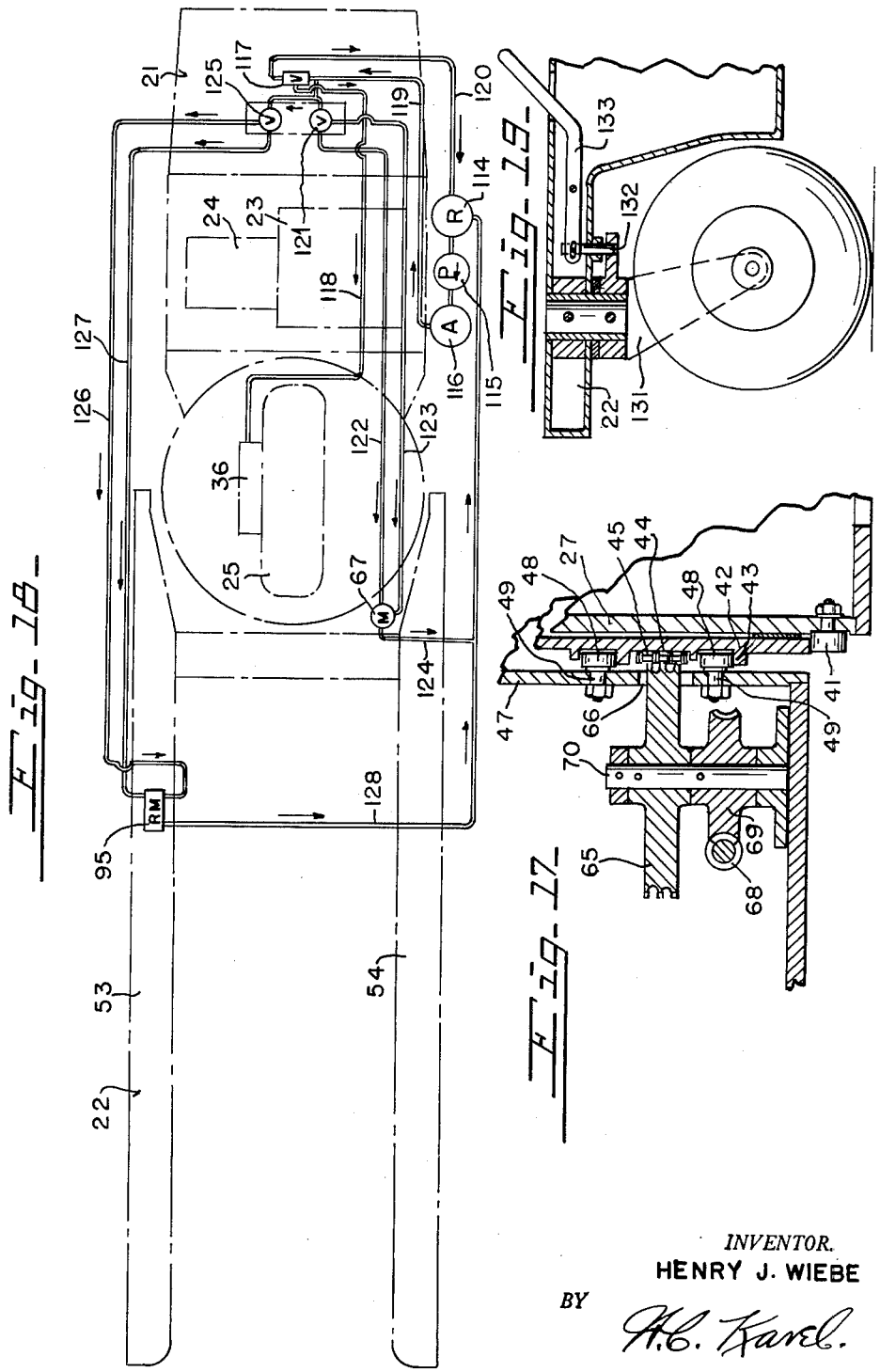
INVENTOR.
HENRY J. WIEBE
BY
*H.C. Karel.*
ATTORNEY.

3,042,130
GROUND MOVER AND RETRIEVER VEHICLE FOR AIRPLANES
Henry J. Wiebe, Cincinnati, Ohio, assignor to General Aeromation, Inc., Cincinnati, Ohio, a corporation of Ohio
Filed Oct. 27, 1959, Ser. No. 849,095
16 Claims. (Cl. 180—14)

This invention relates first, to a relatively light-weight vehicle for moving airplanes on the ground without the use of the airplane's turbine engines or other motive power sources. Secondly, this invention relates to a vehicle also capable for use in retrieving an airplane when it has run off its runway, such as when, upon landing, the airplane's kinetic energy in the landing roll exceeds its braking capacity within the limits of its remaining runway, thereby forcing overrun into unimproved terrain.

Relative to the first part, the movement of multi-engined airplanes on the ground, particularly jet-engine propelled airplanes, has become a real and vexing problem, in that the use of jet-engines is not only very expensive but incurs many problems due to the great blast noises at disturbingly high frequencies, and the violent air disturbances caused by the jet engines. Because the propulsive efficiencies of jet engines are extremely low at ground movement speeds, further, because the overall gross weights of modern long range jet aircraft has increased enormously in the past decade, thereby greatly increasing the rolling resistance of the heavily loaded tires, which cause the jet engines to run as high as eighty percent full-open throttle-setting to start the taxi roll, thereby consuming very large quantities of jet fuel and producing fumes, smoke and tremendous noise.

Many solutions have been proposed, such proposals fall into two categories; towing with a towing bar hitched to a very large and powerful tractor, but due to the limited clearance between the airplane fuselage and the ground and the great length of large airplanes, any traction vehicle which is massive enough to develop enough tractive effort must employ long tow bars which have proved impractical due to the great separation distance between draw-bar and airplane's landing gear tow-attachment points which reduces the vehicle's effectiveness in heavy towing operations. The second group of proposed solutions to moving heavy aircraft on the ground falls into the category of propelling the main landing gears of the airplane by attaching to their wheels some device that will transfer torque to such wheels, so that these main landing gear wheels are made to act as tractor drive-wheels, thereby propelling the airplane. This has been called the wheel-mover principle. All of these methods have proved impractical, inasmuch as they require modifications which must be made upon the wheels; such modifications either weaken the wheel and thereby shorten its life, or when designed originally to take care of such modification, such wheels weigh more thereby adding dead weight to the airplane, both of which are engineering considerations of grave consequences in aircraft design.

Another type of device which has proved impractical in the wheel-mover category is called the friction-drive which has driving-rollers pressed with great force against the periphery of the main landing gear tires, thereby imparting torque to such wheels and propelling the airplane. They have proved impractical for many reasons, inasmuch as insufficient torque is available to the wheel through this medium under many conditions. The great pressure which must be placed upon the drive-rollers causes the tire to suffer internal breakage of its cords, rendering it unsafe for sustaining high rolling loads at take-off gross weights and at impact and during the deceleration upon landing when large braking forces must be absorbed by the main landing gear tires. Wet runway or taxiways further reduce friction between friction drive-rollers as do grease or other foreign matter preventing proper torque transmission from drive-rollers to the main landing gear tires.

This invention also relates to the retrieving of heavy aircraft which have over-run the end of the runway into unimproved terrain. Many proposals and methods of retrieving such an airplane have been tried over the past fifteen years, most of which have been unsuccessful. Two problems are involved, the first is to raise the heavy aircraft up out of the soil into which it has settled, and the second is to move the airplane to its runway after it has been lifted. Very large inflatable bags have been proposed and tried which are placed under the wings of the disabled airplane and inflated thereby lifting the airplane out of the soil. However, this has proved impractical inasmuch as the inflated bag is extremely unstable and readily permits the suspended wings of the airplane resting upon it to roll off to one side or the other in much the same way as a person's body tends to roll off a fully inflated air pillow. Upon lifting, there is no practical method available to move the airplane upon such inflated bag. Most attempts to use this method have been disappointing and unsuccessful. This invention provides a vehicle capable, when used in consort with others of like design, to lift an entire airplane up and out of the soil or unimproved terrain and to move it back to the hard surface runway upon heavy timber cribbing which supports the loads imposed upon the vehicle wheels from the disabled airplane. In the event that the disabled airplane's main landing gears are structurally unsound or destroyed when rolled into such unimproved terrain, accessory truss members may be used to impose the airplane's weight onto the vehicles described herein.

My improved vehicle is designed to move under the fuselage and be readily attached to one of the landing gears of the airplane, employing a single operator to perform all the operations of positioning the vehicle, attaching to the airplane and maneuvering the airplane in any direction either forward, rearward, turning it around or moving it sidewise regardless of the condition of the terrain on which it rests.

The object of my invention is to provide a vehicle of relative light weight capable of moving an airplane on the ground and having means for attaching the vehicle to the airplane, transferring part of the airplane's weight to the vehicle to induce traction, and thereby maneuvering the airplane in any and all directions under the power of the vehicle.

A further object is to provide a vehicle capable, when used in consort with others of like design, to lift an entire airplane up and out of unimproved terrain and move it back to the hard surface runway from which it overran upon landing.

A further object is to provide the vehicle with three wheels, turnable in unison, comprising a pair of forward wheels and a driving wheel.

A further object is to provide a lifting, or airplane weight transferring mechanism centered around the driving wheel having means in connection therewith to attach the vehicle to the landing gear of the airplane.

A further object is to provide a power unit for propelling the vehicle, operating the attaching means and operating the steering mechanism.

A further object is to provide a structure whereby only fore and aft stresses are applied to the landing gear in all maneuvering movements of the vehicle, by applying all forces in such a manner that their composite force is constantly at right angles to the landing gear axle centerline.

A further object is to proportion the weight of the airplane on the vehicle, whereby two-thirds of the weight is imposed on the driving wheel and one-third on the front wheels.

Further objects will be apparent as the description progresses.

My invention will be further readily understood from the following description and claims, and from the drawings, in which latter:

FIG. 1 is a plan view showing my improved vehicle attached to an airplane and showing the airplane making a full turn around or swung on its compass rose.

FIG. 2 is an end view of the vehicle attached to an airplane.

FIG. 3 is a side view of the same.

FIG. 4 is a plan view of my improved vehicle.

FIG. 5 is a side view of the vehicle, with the front chassis in lowered position.

FIG. 6 is a side view of the vehicle, with the front chassis in raised position.

FIG. 8 is a detail plan view, partly in section and partly broken away to show the steering mechanism.

FIG. 9 is a vertical section view, taken in the plane of the line 9—9 of FIG. 8, showing the left side of the forward chassis.

FIG. 10 is a vertical section view, taken in the plane of the line 10—10 of FIG. 8, showing the right side of the forward chassis.

FIG. 11 is a detail section, taken in the plane of the line 11—11 of FIG. 10.

FIG. 12 is a detail section, taken in the plane of the line 12—12 of FIG. 10.

FIG. 13 is a detail section, taken in the plane of the line 13—13 of FIG. 8.

FIG. 14 is a side view of the rotating drum.

FIG. 15 is a detail section, showing the attaching means to the airplane, taken in the plane of the line 15—15 of FIG. 4.

FIG. 16 is a detail section, showing the vehicle straddling the landing wheels and attached to the landing gear, taken in the plane of the line 16—16 of FIG. 4.

FIG. 17 is a detail section, taken in the plane of the line 17—17 of FIG. 4, showing the chain drive for rotating the drum for raising or lowering the outer tubular member.

FIG. 18 is a diagrammatic view of the hydraulic system for operating the rotating drum, the brake, and steering mechanism.

Figure 7:
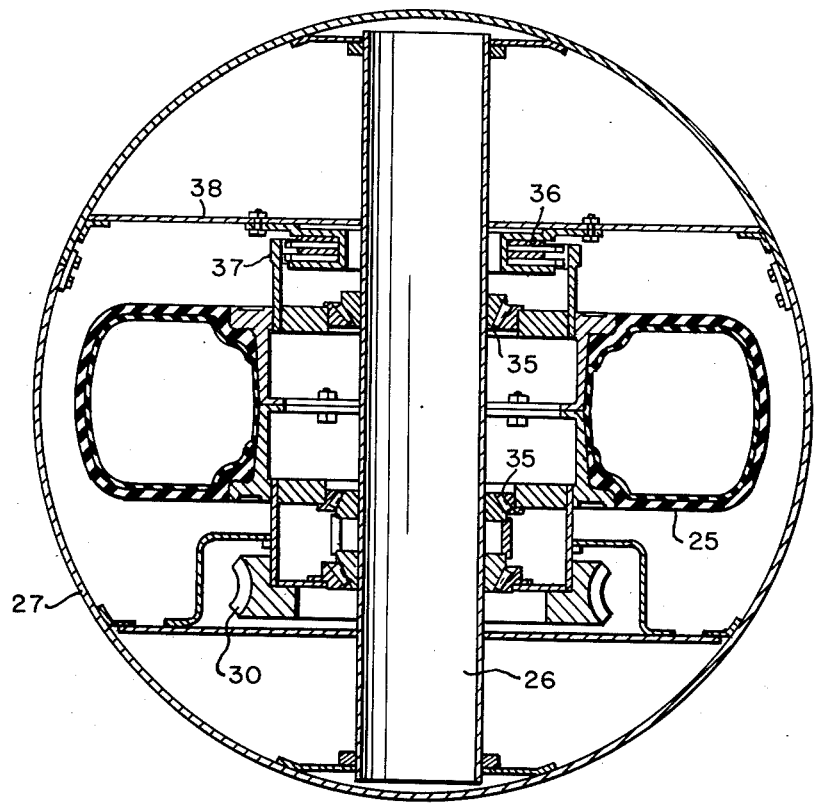
FIG. 7 is a sectional view of the main drive wheel mounting.

My improved vehicle is a low-silhouette structure for moving an airplane indicated at 20 on the ground and comprises a rear chassis 21 and a forward chassis 22. The rear chassis supports a prime mover being a conventional air-cooled, eight cylinder gasoline engine 23, having a hydra-drive power-shift transmission 24, which combines a torque-converter, fluid coupling, and a full power-shift four-speed forward and reverse transmission into one integral unit of standard design, connected thereto to impart rotative power to the drive wheel 25 which is rotatable on an axle 26 mounted in an inner tubular member 27. The inner tubular member 27 has a collar 28 secured to the upper edge thereof and beams 29 secured to the collar 28 extend rearwardly and support the rear chassis 21. Thus the rear chassis is fixed to the inner tubular member 27.

Power from the transmission is transmitted to a worm wheel 30 by means of shafting 31 and a worm gear 32 for driving the drive wheel 25. An operator's seat 33 and control panel 34 are positioned on the rear chassis.

The drive wheel 25 is mounted on roller bearings 35, with the worm-gear 30 secured to the wheel hub. A hydraulic brake 36 of standard design functions between the extended hub 37 and the partition 38 which is secured to the inner tubular member 27. (See FIG. 7.)

The forward chassis 22 is movable vertically, with its axis of movement on the center-line of the front wheels 56 and 57. In the drawings, with the exception of FIG. 5, the forward chassis is shown in its full raised position.

The lower outer periphery of the tubular member 27 is provided with rollers 41. One of these rollers is shown in FIGS. 13 and 17. However, these rollers are spaced completely around the inner tubular member 27 to form a track for a drum 42 to rotate on. This drum 42 is provided with a spiral track 43 about its periphery and intermediate the spiral track is a chain track 44 in which a sprocket chain 45 is secured. This chain is wrapped three and three-eighths times around the drum to provide means for raising and lowering the drum 42. Between the inner face of the drum and the tubular member 27 and spaced at the bottom and top are bands 46 forming bearings between the drum and the inner tubular member. The purpose of these bearings being to support all lateral forces of the drive wheel within the vehicle.

An outer tubular member 47 is provided with rollers 48 journalled on studs 49 and are spirally arranged in spaced relation to ride on the spiral track 43 of the drum 42.

The forward chassis 22 is composed of two parts which are clamped around the outer member 47 by means of clamp bolts 50 and 51. The forward part of the chassis 22 has a cross-member 52 to tie together the extending frames 53 and 54. Mounted in the forward end of the frames 53 and 54 are yokes 55 on which wheels 56 and 57 are journalled.

Secured to the cross-member 52 and centered between the extending frames 53 and 54 is a yoke 58 which is movable up and down with the forward chassis 22. A socket plate 59 is secured in the yoke and has a jack point recess 60 for engagement with a jack point 61 of the landing gear of the airplane. This jack point 61 is on the axle midway between the pair of landing gear wheels. Steering lugs 62 extend from the landing gear axle and spring loaded pins 63 extend from the base of the yoke 58 for engagement with apertures 64 in the steering lugs.

*Raising and Lowering Forward Chassis*

The forward chassis 22 is lowered to move the socket plate 59 under the axle of one of the landing gear axles. The means employed to lower or raise the forward chassis comprises a sprocket wheel 65 extending through an opening 66 in the outer tubular member 47 for engagement with the sprocket chain 45. The sprocket wheel 65 is driven by a reversible hydraulic motor 67 driving a worm 68 meshing with a worm wheel 69 on a shaft 70 to which the sprocket wheel 65 is attached. As the sprocket wheel 65 rotates, the drum 42 through the chain 45 will rotate on the rollers 41 causing the rollers 48 to follow the spiral track 43 for raising or lowering the outer tubular member 47 and the forward chassis 22. The steering mechanism hereinafter described retains the inner tubular member against rotation.

*Steering Mechanism*

Power steering is provided for turning the drive wheel 25 and the forward wheels 56 and 57 mounted on the forward ends of the frames 53 and 54. The yokes 55 are attached to rotatable shafts 71 journalled in the frames and have pulleys 72 and 73 attached to the shafts 71. A rack gear 74 is bolted to the inner periphery of the inner tubular member 27 and a gear 75 fixed to a shaft 76 meshes with the rack 74. The shaft 76 is journalled in bearings 77 and 78. The gear 75 is of sufficient length to always mesh with the rack 74 regardless of the relative position of the inner tubular member 27 to the outer tubular member 47.

A cross-shaft 79 is journalled in the frame 53 and is retained therein by plates 80 secured to the frame. Mounted on the shaft 79 are a pair of cable supporting members 81 and 82 bolted to cam plates 83 and 84 with spacers 85 and 86 between the members. The cam plates are provided with cam slots 87 in the cam plate 83 and cam slots 88 in the cam plate 84. A shaft 89 is journalled in the frame 53 and has a threaded portion 90 for moving a threaded block 91 forward or backward. The block 91 carries rollers 92 and 93 mounted on a shaft 94 and riding in the respective cam slots 87 and 88. On one end of the shaft 89 is a reversible hydraulic motor 95 for imparting rotation to the shaft 89. The other end of the shaft 89 has a sprocket wheel 96 attached thereto, and by means of a sprocket chain 97 imparts rotation to a sprocket wheel 98 mounted on a shaft 99 journalled in bearings 100 and 101 mounted on the bottom of the frame member which attaches the forward frames to the tubular member 47. This shaft imparts rotation to the shaft 76 through bevel gears 102 and 103. The bearings 77 and 78 extend from the bearing 101.

Cables are employed to impart rotative movement to the front wheels for steering the vehicle. A cable 104 has one end held in member 81 and extends over a pulley 105, pulley 106, around the pulley 72 having a ball 107 swedged to the cable for engagement with a recess 108 in the pulley 72. The cable continues over a pulley 109, pulley 110 below the pulley 105 and has its other end attached to the opposite side of the member 81, with other guide pulleys provided to guide the cable to the main pulleys.

A cable 111 has one end attached to the member 82 and extends over a guide pulley and around the pulley 73 having a ball 112 swedged thereto engaging a recess 113 in the pulley 73 and running over guide pulleys to the lower side of the member 82.

Figure 19:
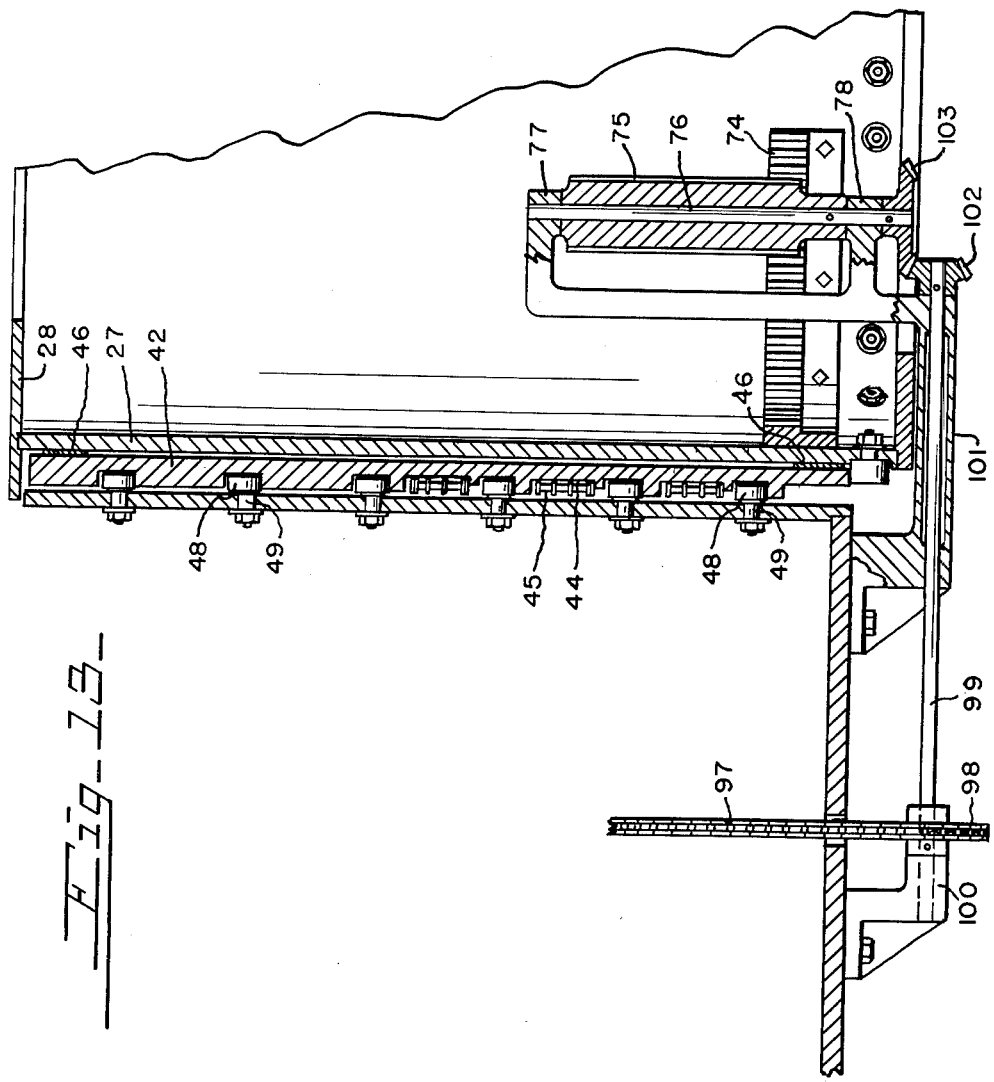
FIG. 19 is a view of the forward modified wheel mounting.

If desired the vehicle can be operated without the front wheels having steering connections. In such a structure the reversible hydraulic motor 95 is attached to the shaft 99 for imparting rotation to the gear 75 for moving the rack 74 to rotate the inner tubular member 27 to give direction to the drive wheel. The forward wheels 56 and 57 are mounted in offset yokes 131, which are free to rotate in the forward ends of the frames, permitting the forward wheels to follow the turn direction of the main drive wheel 25. (See FIG. 19.) However, a lock pin 132 is provided operated by a handle 133 to lock the wheels in a centered position for stabilization of movement of the vehicle when not attached to an airplane. These pins are released when the vehicle is attached to an airplane.

*Hydraulic System:* (See FIG. 18)

A hydraulic reservoir 114 is provided to supply hydraulic fluid for the operation of a hydraulic pump 115 driven by the prime mover. The pump 115 supplies fluid under pressure to the accumulator 116. A foot operated valve 117 mounted in suitable relation to the driver's seat provides hydraulic control through a line 118 to the hydraulic brake 36. The valve 117 is connected to the accumulator by a line 119. A return line 120 from the valve 117 returns fluid to the reservoir. A reversing valve 121 on the control panel 34 feeds fluid under pressure through line 122 and 123 to the reversing motor 67 for operating the lifting mechanism. A return line 124 returns the fluid to the reservoir.

A reversing valve 125 on the control panel 34 supplies fluid from the accumulator 116 to a reversing motor 95 through lines 126 and 127 for operating the steering mechanism. A return line 128 to the reservoir is provided.

*Operation*

The operator is seated on the seat 33 on the rear of the rear chassis 21. From this position he has complete vision of all operations. The vehicle is driven under the fuselage of the airplane with the forward frame members straddling one of the forward landing gears to a position wherein the jack point 61 on the landing gear axle is directly over the jack point recess 60 in the plate 59. The control handle 129 operates the valve 121 causing the hydraulic motor 67 to impart rotation to sprocket wheel 65 engaging the sprocket chain 45 causing the drum 42 to rotate for lifting the outer tubular member 47 and the forward frame, which raises the plate 59 for forming a connection with the jack point 61 on the axle of the landing gear and loading the vehicle with a portion of the weight of the airplane. At the same time the spring loaded pins 63 engage the apertures in the landing gear steering lugs on the airplane axle. The vehicle is now in position to maneuver the airplane in any direction. The thrust on the landing gear is always at right angles to its axle, thus preventing any damage to the landing gear.

To maneuver the vehicle the steering control handle 130 is turned to the right or left depending on the desired direction of travel and this movement causes the valve 125 to feed fluid under pressure to the reversible hydraulic motor 95 for rotating the shaft 89, moving the block 91 along the shaft 89 causing the cam rollers 92 and 93 to move the cam plate about the shaft 79 for rotating the cable plates 81 and 82 to turn the pulleys 72 and 73 for turning the forward wheels 56 and 57 in unison. At the same time the gear 75 rotates the inner tubular member 27 for turning the drive wheel 25 in the reverse direction of the forward wheels, whereby the movement of the vehicle is always centered on the jack point. The airplane can be turned on its compass rose as shown in FIG. 1, or moved in any direction with the operator having full vision of the movement of the airplane. Or by moving back and forth in short crabbing movements, it is possible to move the airplane sideways on a ramp or in a hanger under restricted fore and aft movement conditions.

The vehicle is designed for a twenty-nine foot six inches turning radius. The center of the turning radius, when viewed in FIG. 1, is located at all times on an extended centerline, which passes through the landing gear axle centerline, to eliminate side-thrust and moments. The rate of turn of the vehicle's three wheels is coordinated so that when the main drive wheel is turned full right or left at twelve degrees, the forward inside and outside pilot wheels turn twenty-five and twenty degrees respectively. The rate of turn of vehicle's three wheels in partial turns is designed so that the center of the turning radius continues to be located on an extension of the landing gear axle centerline.

Differing from most other designs, this vehicle applies only direct forward and rearward forces to the landing gear. When viewed in FIG. 1, this force is always at right angles to the axle centerline in all degress of turn or maneuvering configuration forward or reverse, and is applied only upon the application of power to the main drive wheel of the vehicle.

Balanced turning couples at the vehicle's main drive wheel and two forward pilot wheels when turned produce balanced turning forces on the landing gear when towing power is applied. This is a desirable safety feature that eliminates all unbalanced leverages and side-thrust at the landing gear.

The only remaining force which the vehicle applies to the landing gear is the lifting force which is applied directly under the axle as a portion of the weight normally resting on the landing gear is transferred to the vehicle's main drive wheel and pilot wheels on a ratio of two to one. The weight which can be so transferred is regulated by the operator through the vehicle's lifting mechanism. The wheels of the landing gear to which the vehicle is attached remain in contact with the ground under all towing conditions, eliminating all possibility of dropping the landing gear and providing desirable safety feature to the airplane.

Thus when an airplane is on the ground, my improved vehicle can move the airplane to any desired location with a minimum of effort and personnel.

Having thus fully described my invention, what I claim as new and desire to secure by Letters Patent, is:

1. A ground mover and retriever vehicle for airplanes comprising a forward chassis and a rear chassis, a tubular member supporting said rear chassis, a power driven wheel mounted in said tubular member, a drum rotatively supported about said tubular member, an outer tubular member about said drum, said forward chassis extending from said outer tubular member, wheels in the forward end of said forward chassis, and means between said drum and outer tubular member for raising and lowering said outer tubular member upon rotation of said drum.

2. A ground mover and retriever vehicle for airplanes comprising a forward chassis and a rear chassis, a tubular member supporting said rear chassis, a power driven wheel mounted in said tubular member, a drum rotatively supported about said tubular member, an outer tubular member about said drum, said forward chassis extending from said outer tubular member, wheels in the forward end of said forward chassis, means between said drum and outer tubular member for raising and lowering said outer tubular member upon rotation of said drum, and means on said forward chassis for attachment to the landing gear of an airplane.

3. A ground mover and retriever vehicle for airplanes comprising a forward chassis and a rear chassis, a tubular member supporting said rear chassis, a power driven wheel mounted in said tubular member, a drum rotatively supported about said tubular member, an outer tubular member about said drum, said forward chassis extending from said outer tubular member, wheels in the forward end of said forward chassis, means between said drum and outer tubular member for raising and lowering said outer tubular member upon rotation of said drum, means on said forward chassis for attachment to the landing gear of an airplane, and balanced turning couples between the main drive wheel and the two forward wheels producing balanced turning forces on the landing gear.

4. A ground mover and retriever vehicle for airplanes comprising a forward chassis and a rear chassis, a tubular member mounted vertically in said rear chassis, a prime mover on said rear chassis, a drive wheel mounted in said tubular member, means connecting said prime mover with said wheel for applying rotative power to said drive wheel, a drum rotatively mounted on and about said tubular member, said forward chassis having spaced apart forwardly extending frames, wheels on the forward ends of said frames, an outer tubular member in said forward chassis and encompassing said drum, said drum having a spiral track on its outer periphery, said outer tubular member provided with rollers engaging said track, a jack point recess in an extension of said forward chassis between said spaced frame members, and means for rotating said drum relative to said outer tubular member to raise or lower said forward chassis to form a connection between said jack point recess and the jack point on the airplane landing gear.

5. A ground mover and retriever vehicle for airplanes comprising a forward chassis and a rear chassis, a tubular member mounted vertically in said rear chassis, a prime mover on said rear chassis, a drive wheel mounted in said tubular member, means connecting said prime mover with said wheel for applying rotative power to said drive wheel, a drum rotatively mounted on and about said tubular member, said forward chassis having spaced apart forwardly extending frames, wheels on the forward ends of said frames, an outer tubular member in said forward chassis and encompassnig said drum, said drum having a spiral track on its outer periphery, said outer tubular member provided with rollers engaging said track, a jack point recess in an extension of said forward chassis between said spaced frame members, means for rotating said drum relative to said outer tubular member to raise or lower said forward chassis to form a connection between said jack point recess and the jack point on the airplane landing gear, and steering mechanism connecting all three wheels for balanced turning forces on the landing gear.

6. A ground mover and retriever vehicle for airplanes comprising a forward chassis and a rear chassis, a tubular member mounted vertically in said rear chassis, a prime mover on said rear chassis, a drive wheel mounted in said tubular member, means connecting said prime mover with said wheel for applying rotative power to said drive wheel, a drum rotatively mounted on and about said tubular member, said forward chassis having spaced apart forwardly extending frames, wheels on the forward ends of said frames, an outer tubular member in said forward chassis and encompassing said drum, said drum having a spiral track on its outer periphery, said outer tubular member provided with rollers engaging said track, a jack point recess in an extension of said forward chassis between said spaced frame members, means for rotating said drum relative to said outer member to raise or lower said forward chassis to form a connection between said jack point recess and the jack point on the airplane landing gear, steering mechanism connecting all three wheels for balanced turning forces on the landing gear, and means for forming a turning couple between said jack point extension and the landing gear.

7. A ground mover and retriever vehicle for airplanes comprising a forward chassis and a rear chassis, a tubular member mounted vertically in said rear chassis, a prime mover on said rear chassis, a drive wheel mounted in said tubular member, means connecting said prime mover with said wheel for applying rotative power to said drive wheel, a drum rotatively mounted on and about said tubular member, said forward chassis having spaced apart forwardly extending frames, wheels on the forward ends of said frames, an outer tubular member in said forward chassis and encompassing said drum, said drum having a spiral track on its outer periphery, said outer tubular member provided with rollers engaging said track, a jack point recess in an extension of said forward chassis between said spaced frame members, means for rotating said drum relative to said outer tubular member to raise or lower said forward chassis and form a towing connection between said jack point recess and the jack point on the airplane landing gear, and said jack point positioned between said wheels whereby two-thirds of the weight of the airplane imposed on the wheels will be on the drive wheel.

8. A ground mover and retriever vehicle for airplanes comprising a forward chassis and a rear chassis, a tubular member mounted vertically in said rear chassis, a prime mover on said rear chassis, an operator's seat and controls on said rear chassis, a drive wheel mounted in said tubular member, means connecting said prime mover with said wheel for applying rotative power to said drive wheel, a drum rotatively mounted on and about said tubular member, said forward chassis having spaced apart forwardly extending frames, wheels on the forward ends of said frames, an outer tubular member in said forward chassis and encompassing said drum, said drum having a spiral track on its outer periphery, said outer tubular member provided with rollers engaging said track, a jack point recess in an extension of said forward chassis between said spaced frame members, said jack point recess engageable with a jack point on a landing gear of the airplane to form a towing connection between said vehicle and airplane, and hydraulic means for rotating said drum relative to said outer tubular member to raise or lower said forward chassis.

9. A ground mover and retriever vehicle for airplanes comprising a forward chassis and a rear chassis, screw elevating means between said chassis for moving the forward chassis vertically in relation to the rear chassis, a drive wheel mounted in said rear chassis within said screw elevating means, a pair of spaced apart frames extending forward from said forward chassis, wheels mounted on the ends of said frames, means for horizontally rotating said rear chassis relative to said forward chassis for steering said vehicle, a prime mover on said rear chassis for driving said drive wheel, and means on said forward chassis for forming a connection with the landing gear of an airplane.

10. A ground mover and retriever vehicle for airplanes comprising a drive wheel, a prime mover for driving said wheel, a lifting mechanism centered on said drive wheel comprising a vertical tubular member supported on said drive wheel, a drum rotatable on said tubular member, an outer tubular member, means between said drum and outer tubular member for moving said outer tubular member vertically on said drum, a pair of spaced frame members extending forwardly from said outer tubular member, wheels journalled on the ends of said frame members, and an engaging mechanism mounted between said frame members and movable with said outer tubular member for attaching said vehicle to the landing gear of an airplane.

11. A ground mover and retriever vehicle for airplanes comprising a drive wheel, a prime mover for driving said wheel, a lifting mechanism centered on said drive wheel comprising a vertical tubular member supported on said drive wheel, a drum rotatable on said tubular member, an outer tubular member, means between said drum and outer tubular member for moving said outer tubular member vertically on said drum, a pair of spaced frame members extending forwardly from said outer tubular member, wheels journalled on the ends of said frame members, an engaging mechanism mounted between said frame members and movable with said outer tubular member for attaching said vehicle to the landing gear of an airplane, and means for steering said vehicle.

12. A ground mover and retriever vehicle for airplanes comprising a drive wheel, a prime mover for driving said wheel, a lifting mechanism centered on said drive wheel comprising a vertical tubular member supported on said drive wheel, a drum rotatable on said tubular member, means for rotating said drum operated by said prime mover, an outer tubular member, means between said drum and outer tubular member for moving said outer tubular member vertically on said drum, a pair of spaced frame members extending forwardly from said outer tubular member, wheels journalled on the ends of said frame members, and an engaging mechanism mounted between said frame members and movable with said outer tubular member for attaching said vehicle to the landing gear of an airplane.

13. A ground mover and retriever vehicle for airplanes comprising a drive wheel, a prime mover for driving said wheel, a lifting mechanism centered on said drive wheel comprising a vertical tubular member supported on said drive wheel, a drum rotatable on said tubular member, means for rotating said drum operated by said prime mover, an outer tubular member, means between said drum and outer tubular member for moving said outer tubular member vertically on said drum, a pair of spaced frame members extending forwardly from said outer tubular member, wheels journalled on the ends of said frame members, an engaging mechanism mounted between said frame members and movable with said outer tubular member for attaching said vehicle to the landing gear of an airplane, and means for turning said drive wheel for steering said vehicle.

14. A ground mover and retriever vehicle for airplanes comprising a drive wheel, a prime mover for driving said wheel, a lifting mechanism centered on said drive wheel comprising a vertical tubular member supported on said drive wheel, a drum rotatable on said tubular member, hydraulic means for rotating said drum operated by said prime mover, an outer tubular member encompassing said drum, spiral mating means between said drum and outer tubular member for moving said outer tubular member vertically on said drum, a pair of spaced frame members extending forwardly from said outer tubular member, wheels journalled on the ends of said frame members, and an engaging mechanism mounted between said frame members and movable with said outer tubular member for attaching said vehicle to the axle of the landing gear of an airplane.

15. A ground mover and retriever vehicle for airplanes comprising a forward chassis and a rear chassis, a prime mover on said rear chassis, pilot wheels on said forward chassis, said forward chassis having a portion encompassing a portion of the rear chassis to form a rotatable connection, a drive wheel on said rear chassis within said rotatable connection, a rotatable screw member interposed between said encompassing portions of said chassis for raising said forward chassis relative to said rear chassis for engagement and loading of said forward chassis with an airplane.

16. A ground mover and retriever vehicle for airplanes comprising a forward chassis and a rear chassis, a prime mover on said rear chassis, pilot wheels on said forward chassis, said forward chassis having a portion encompassing a portion of the rear chassis to form a rotatable connection, a drive wheel on said rear chassis within said rotatable connection, a rotatable screw member interposed between said encompassing portions of said chassis for raising and lowering said forward chassis relative to said rear chassis for engagement and loading of said forward chassis with an airplane, means operable in connection with said rotatable connection for steering said vehicle, and means on said forward chassis for attachment to an airplane.

References Cited in the file of this patent

UNITED STATES PATENTS

| | | |
|---|---|---|
| 698,738 | Roney | Apr. 29, 1902 |
| 893,658 | Ross | July 21, 1908 |
| 1,663,140 | Remde | Mar. 20, 1928 |
| 2,366,892 | Donnellan | Jan. 9, 1945 |
| 2,651,379 | Elliott et al. | Sept. 8, 1953 |

FOREIGN PATENTS

| | | |
|---|---|---|
| 1,010,912 | Germany | June 19, 1957 |
| 600,130 | Great Britain | Apr. 1, 1948 |